United States Patent [19]

Trezequet

[11] 4,389,088
[45] Jun. 21, 1983

[54] UNDERWATER OPTICAL FIBRE CABLE

[75] Inventor: Jean-Pierre Trezequet, Calais, France

[73] Assignee: Les Cables de Lyon, Lyons, France

[21] Appl. No.: 163,659

[22] Filed: Jun. 27, 1980

[30] Foreign Application Priority Data

Jun. 28, 1979 [FR] France .................. 79 16717

[51] Int. Cl.³ ............................................. G02B 5/172
[52] U.S. Cl. .................................................. 350/96.23
[58] Field of Search ..................... 350/96.23; 174/70 R

[56] References Cited

U.S. PATENT DOCUMENTS

| | | | |
|---|---|---|---|
| 4,154,049 | 5/1979 | King et al. ............... | 350/96.23 X |
| 4,156,104 | 5/1979 | Mondello .................. | 174/70 R |
| 4,227,770 | 10/1980 | Gunn ........................ | 350/96.23 |
| 4,257,675 | 3/1981 | Nakagome et al. ......... | 350/96.23 |
| 4,288,144 | 9/1981 | Nakai et al. ............... | 350/96.23 |

FOREIGN PATENT DOCUMENTS

| | | | |
|---|---|---|---|
| 2511019 | 9/1976 | Fed. Rep. of Germany ... | 350/96.23 |
| 2519050 | 11/1976 | Fed. Rep. of Germany ... | 350/96.23 |
| 2288318 | 5/1976 | France . | |
| 2312788 | 12/1976 | France ..................... | 350/96.23 |
| 1470890 | 4/1977 | United Kingdom .......... | 350/96.23 |
| 2010528 | 6/1979 | United Kingdom . | |

OTHER PUBLICATIONS

Alimov et al, "Load-Bearing Optical Cable," *Sov. J. Quantum Electron.*, vol. 9, No. 12, Dec. 1979, pp. 1580–1581.

*Primary Examiner*—John D. Lee
*Attorney, Agent, or Firm*—Sughrue, Mion, Zinn, Macpeak & Seas

[57] ABSTRACT

An underwater optical fibre cable, including a central filament (1) whose lateral surface is provided with helical grooves (3) in each of which at least one optical fibre (4) can be placed, characterized in that the transversal cross-section and dimensions of said grooves enable then to provide a degree of freedom for said fibre in the order of at least half of its transversal dimension and within said groove, further said central filament being made of at least one metal or alloy.

6 Claims, 4 Drawing Figures

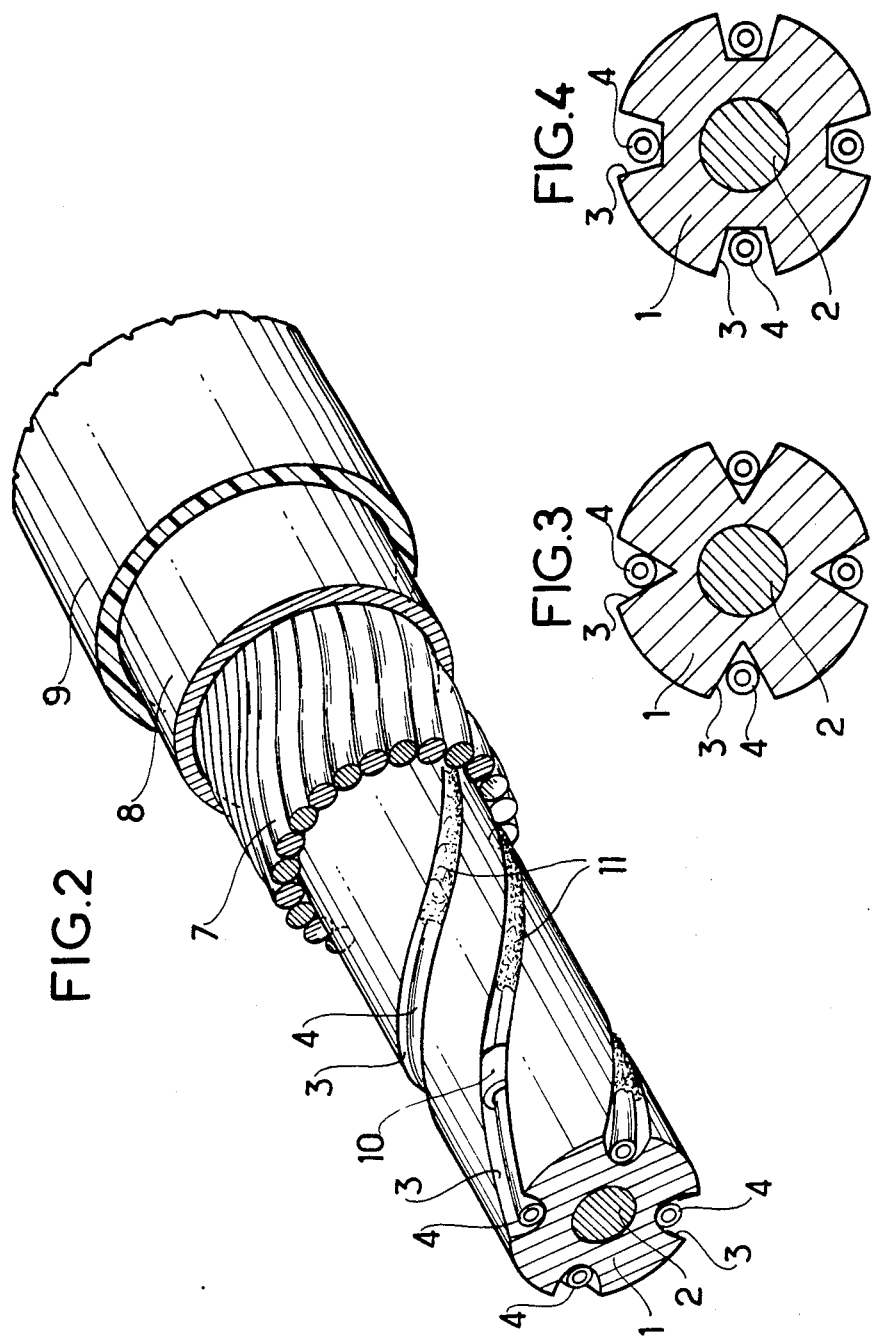

UNDERWATER OPTICAL FIBRE CABLE

FIELD OF THE INVENTION

The present invention relates to an underwater optical fibre cable including a central filament provided with helical grooves for receiving at least one optical fibre in each groove, the groove cross-section being such that an optical fibre therein can move transversally by at least half of its transversal dimension.

BACKGROUND OF THE INVENTION

French patent application No. 2,288,318 describes an optical fibre cable of the above type in which the central filament is made of a plastics material and is in the form of a spoked wheel with a core formed by steel wires and grooves separated by thin partitions. However, its thin plastics partitions make it somewhat fragile, whereas it must be suitable for winding onto and off cable drums and for handling during laying. Preferred embodiments of the present invention provide a very strong underwater optical fibre cable which can be readily handled without taking particular precautions during laying.

SUMMARY OF THE INVENTION

The present invention provides an underwater optical fibre cable including a central filament provided with helical grooves for receiving at least one optical fibre in each groove, the groove cross-section being such that an optical fibre therein can move transversally by at least half of its transversal dimension, wherein said central filament is made of a metal or a metal alloy.

Further, the cable preferably includes at least one of the following features:

The grooves are separated by solid zones of the periphery of the central filament, said solid zones forming sectors which are at least as broad as the intervening grooves are wide.

The groove cross-section has a semi-elliptical shape.

Said central filament is covered successively by a first metal tube, an insulating covering, a layer of metal wires wound helically in contiguous turns, a second metal tube and a second insulating covering.

Said central filament is covered successively by a layer of metal wires wound helically in contiguous turns, a metal tube and an insulating covering.

The winding pitch of said metal wires is shorter than the pitch of the helical grooves.

The space of said grooves which is not occupied by the optical fibre is filled with a water-repellent liquid.

Sealing plugs are disposed at intervals and longitudinally in said grooves.

Other characteristics and advantages of the invention become apparent from the following description given by way of a purely illustrative and non-limiting example with reference to the accompanying drawings.

BRIEF DESCRIPTION OF THE DRAWINGS

FIG. 2 is a similar perspective view to that of FIG. 1 which illustrates a second embodiment of an undersea optical fibre cable in accordance with the invention.

FIGS. 3 and 4 are transverse sections which illustrate variants of said first and second embodiments.

DESCRIPTION OF PREFERRED EMBODIMENTS

Figure 1:
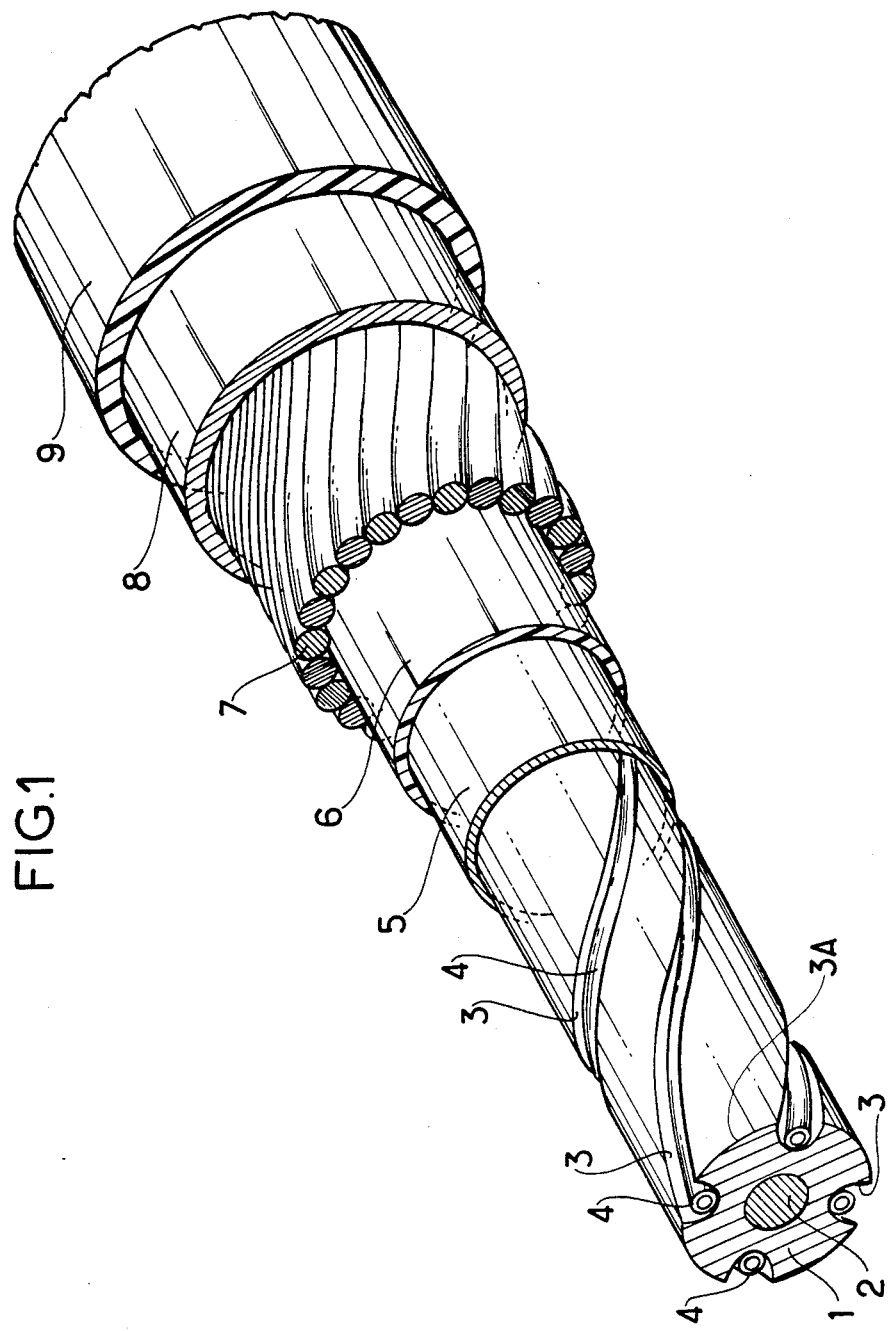
FIG. 1 is a broken perspective view which illustrates a first embodiment of an undersea optical fibre cable in accordance with the invention.

In a first embodiment of the invention shown in FIG. 1, an underwater optical fibre cable includes a cylindrical central filament 1 made of a metal such as copper or aluminium. Advantageously, the central filament includes a strength member 2 made of a harder metal, e.g. steel.

Helical grooves 3 are provided in the peripheral surface of said central filament by machining or by extrusion and at a pitch of a few tens of centimeters, with equal and constant spacing so as to form a quad configuration. An optical fibre 4 is placed in each of these grooves 3. As illustrated, at the end of the cable, the cross-section of each groove is substantially semi-elliptical or U-shaped. The transversal dimensions of said cross-section are greater than the diameter of the optical fibre 4. In other words, there remains some play between the fibre 4 and its groove 3 so that said fibre always has a degree of freedom in the order of at least half its transversal dimension. Said grooves are separated by solid zones 3A which form sectors that are at least as broad as the intervening grooves are wide. However, there may be more than four grooves. For example, there may be six.

The central filament 1 has an aluminium tube 5 a few tenths of a millimeter to a few millimeters thick fitting round it, applied by extrusion or by longitudinally welding a tape followed by drawing through a die. The function of such a tube is to protect the optical fibres 4 from the effects of outside pressure. In its turn, the tube 5 is covered by an extrusion technique by a covering 6 which is several millimeters thick and made of a plastics material such as polyethylene or polypropylene, firstly so as to provide electrical insulation with respect to the outside medium, and secondly to make remote feeding of the repeaters possible in the case where the length of the undersea lines requires the use of such devices. A layer of steel wires 7 helically wound in contiguous turns surrounds the covering 6, but at a shorter pitch than that of the grooves 3. The aim of such wires is simultaneously to absorb the tensile forces exerted on the cable and to form armouring capable of withstanding compression which results from outside pressure.

The cable may optionally include another metal protection 8 formed by a tube extruded or welded longitudinally from a tape on said wires 7 with a view to increasing the electrical conductivity of the cable or to ensure a return for the supply of current to the repeaters. Lastly, the assembly may be covered with a second plastics covering 9 and may thus protect the subjacent layers against infiltration of water and corrosion.

FIG. 2 shows a second embodiment of an undersea optical fibre cable with a simpler structure.

It is seen that with respect to the first embodiment, the aluminium tube 5 and the plastics covering 6 are purely and simply omitted and that the steel wire layer 7 is wound directly onto the central filament 1. The wires are held by the metal tube 8 and the assembly is protected by the plastics covering 9 as in the first embodiment. Further, the grooves 3 may advantageously be filled with a liquid or a grease, in particular a silicone grease 11, whose water-repellent qualities prevent infiltration of water and which also balances the pressures transmitted from the outside. Of course, such a substance must always be sufficiently fluid at low temperatures such as that which prevails at the bottom of the sea, i.e. about 0° to 4° C.

Likewise, sealing plugs such as 10 may be installed at intervals in the space between the optical fibres 4 and the grooves 3 to stop water from propagating longitudinally in the event of infiltration.

FIG. 3 shows a variant in which the cross-sectrion of the grooves 3 may be V-shaped or shaped like an isoceles triangle with an open base and FIG. 4 shows another variant in which said grooves have a cross-section shaped like a trapezium open on its largest side.

Whatever embodiment chosen, it is seen that firstly the play provided between each optical fibre and its groove and secondly the fact that the central filament is made of metal allows the fibres not to undergo lateral or axial stresses during the movement imparted to the cable, in particular while it is being laid and is affected to temperature variations. The invention is used in the field of telecommunications.

Although the embodiments described and illustrated appear to be preferable, details therein can be modified without going beyond the scope of the invention.

I claim:

1. An underwater optical fibre cable including a central filament provided with helical grooves for receiving at least one optical fibre in each groove, the improvement wherein the groove cross-section is such that an optical fibre therein can move transversally by at least half of its transversal dimension, said central filament being made of a metal or a metal alloy, and wherein said central filament is covered successively by a first metal tube surrounding and contacting said metal or metal alloy central filament, an insulating covering and a layer of metal wires wound helically in contiguous turns.

2. An underwater optical fibre cable including a central filament provided with helical grooves for receiving at least one optical fibre in each groove, the improvement wherein the groove cross-section is such that an optical fibre therein can move transversally by at least half of its transversal dimension, said central filament being made of a metal or a metal alloy, and wherein said central filament is covered successively by a first metal tube, an insulating covering, a layer of metal wires wound helically in contiguous turns, a second metal tube and a second insulating covering.

3. An underwater cable according to claim 2, wherein the winding pitch of said metal wires is shorter than the pitch of the helical grooves.

4. An underwater optical fibre cable including a central filament provided with helical grooves for receiving at least one optical fibre in each groove, the improvement wherein the groove cross-section is such that an optical fibre therein can move transversally by at least half of its transversal dimension, said central filament being made of a metal or a metal alloy, and wherein the space of said grooves which is not occupied by the optical fibre is filled with a water-repellent liquid.

5. An underwater cable according to claim 4, wherein sealing plugs are disposed at intervals and longitudinally in said grooves.

6. An underwater optical fibre cable including a central filament provided with helical grooves for receiving at least one optical fibre in each groove, the improvement wherein the groove cross-section is such that an optical fibre therein can move transversally by at least half of its transversal dimension, said central filament being made of a metal or a metal alloy, and wherein sealing plugs are disposed at intervals and longitudinally in said grooves.

* * * * *